United States Patent [19]

Ninane et al.

[11] Patent Number: 4,677,229

[45] Date of Patent: Jun. 30, 1987

[54] PROCESS FOR THE PRODUCTION OF A WATER-INSOLUBLE NITROGENOUS ORGANIC BASE, STARTING FROM AN AQUEOUS SOLUTION OF AN ALKALI METAL BICARBONATE AND THE HYDROCHLORIDE OF THE SAID BASE AND PROCESS FOR THE MANUFACTURE OF SODIUM BICARBONATE

[75] Inventors: Léon Ninane; Claude Breton, both of Dombasle-sur-Meurthe, France

[73] Assignee: Solvay & Cie. (Société Anonyme), Brussels, Belgium

[21] Appl. No.: 754,972

[22] Filed: Jul. 15, 1985

[30] Foreign Application Priority Data

Jul. 17, 1984 [FR] France ................................ 84 11424

[51] Int. Cl.$^4$ .............................................. C07C 85/26
[52] U.S. Cl. ..................................... 564/437; 564/497; 423/181; 423/190; 423/423
[58] Field of Search ................ 564/437, 497; 423/423, 423/190, 181

[56] References Cited

FOREIGN PATENT DOCUMENTS 57-34020 2/1982 Japan .
1082436 9/1967 United Kingdom .

OTHER PUBLICATIONS

Chemcial Abstracts No. 96:202029j (1982).

*Primary Examiner*—Charles F. Warren
*Assistant Examiner*—John A. Sopp
*Attorney, Agent, or Firm*—Spencer & Frank

[57] ABSTRACT

Process for the production of a water-insoluble nitrogeneous organic base, from an aqueous solution of alkali metal bicarbonate and the base hydrochloride, according to which the solution (11) is treated with a complement of the base hydrochloride (12), and the resultant liquid (18) is treated with a basic agent (30) capable of decomposing the hydrochloride. The invention is applied to the regeneration of the amine in the process for the manufacture of sodium bicarbonate by the amines method.

10 Claims, 1 Drawing Figure

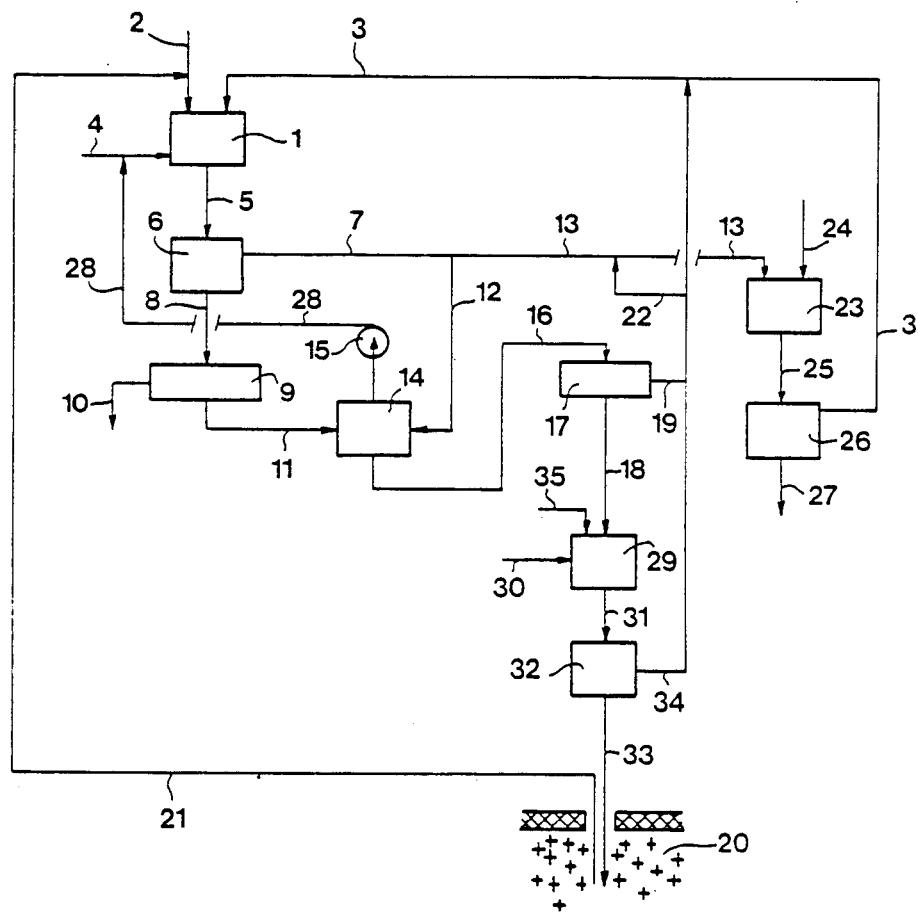

PROCESS FOR THE PRODUCTION OF A WATER-INSOLUBLE NITROGENOUS ORGANIC BASE, STARTING FROM AN AQUEOUS SOLUTION OF AN ALKALI METAL BICARBONATE AND THE HYDROCHLORIDE OF THE SAID BASE AND PROCESS FOR THE MANUFACTURE OF SODIUM BICARBONATE

BACKGROUND OF THE INVENTION

1. Field of the Invention

The invention relates to a process for the production of a water-insoluble nitrogenous organic base, for example an amine, from an aqueous solution of an alkali metal bicarbonate and the hydrochloride of the said nitrogenous organic base.

2. Description of the Art

A method for the manufacture of potassium or sodium bicarbonate is known, according to which an aqueous solution of potassium or sodium chloride is mixed with an organic solution of a water-insoluble amine, the resultant mixture is treated with a gas containing carbon dioxide and is then subjected to gravity separation to separate an aqueous suspension of potassium or sodium bicarbonate from an organic solution of amine hydrochloride, the aqueous suspension is treated to separate off the solid potassium or sodium bicarbonate which it contains from a mother liquor and the amine is regenerated from the organic solution of amine hydrochloride (Patent GB-A-1,082,436 (Kaiser Aluminum & Chemical Corporation), page 2, line 105 to page 3, line 5; Central Patents Index, Basic Abstracts Journal, Section E, Week T.49, Derwent Publications Ltd., London, Abstract 78430T-E: Patent Application JP-A-7241237 (Israel Mining Ind. Inst. Res. & Dev.)).

In the description which follows the expression "amines method" will refer to this known method for the manufacture of potassium or sodium bicarbonate.

In this known method it can happen that the mother liquor, saturated with alkali metal bicarbonate, also contains dissolved amine hydrochloride. This is the case particularly when the amine employed is triethylamine or a primary alkylamine containing fewer than 18 carbon atoms in its molecule, such as that known under the tradename Primene 81R (Rohm & Haas), which contains approximately 12 to 14 carbon atoms in its molecule. In a known amines method which employs triethylamine the mother liquor is treated with a basic agent (calcium hydroxide) to decompose the amine hydrochloride which is dissolved in it and the amine is collected (Patent IL-A-33,551 (IMI (TAMI) Institute for Research and Development), page 8, Example 3). This known process for regenerating the amine involves an excessive consumption of basic agent, a considerable part of which is in fact consumed uselessly to decompose the sodium bicarbonate in the mother liquor.

SUMMARY OF THE INVENTION

The invention overcomes this disadvantage by providing a process which, all else being equal, makes it possible to reduce the consumption of basic agent required to recover the water-insoluble nitrogenous organic bases, from their hydrochloride dissolved in aqueous solutions of alkali metal bicarbonate.

Consequently, the invention relates to a process for the production of a water-insoluble nitrogenous organic base, starting from an aqueous solution of alkali metal bicarbonate and the hydrochloride of the said nitrogenous organic base; according to the invention, the aqueous solution is first treated with a complement of the hydrochloride of the nitrogenous organic base, and then with a basic agent capable of decomposing the hydrochloride dissolved in the aqueous solution.

In the process according to the invention the nitrogenous organic base is, by definition, any water-insoluble nitrogenous organic reactant of a sufficiently basic nature to react with hydrogen chloride to form the base hydrochloride. The expression "water-insoluble" is understood to mean that the solubility of the nitrogenous organic base in water does not exceed 2% by weight of solution, preferably 1%.

The aqueous solution is generally saturated with the hydrochloride of the nitrogenous organic base to be produced. Its hydrochloride content then depends on various factors, particularly on the nitrogenous organic base to be produced and on temperature. It may, furthermore, be a solution which is saturated or not saturated with alkali metal bicarbonate. For example, it may be a solution containing at least 0.05% by weight of the organic base hydrochloride and at least 1% by weight of alkali metal bicarbonate, particularly an aqueous solution containing between 0.1 and 10% by weight of the hydrochloride of the nitrogenous organic base to be produced and between 1 and 9% by weight of alkali metal bicarbonate. The process according to the invention is suitable in the case of aqueous solutions simultaneously saturated with the hydrochloride of the nitrogenous organic base to be produced and with alkali metal bicarbonate. The aqueous solution may, if appropriate, contain other dissolved substances, such as alkali or alkaline-earth metal chloride.

The function of the complement of hydrochloride of the nitrogenous organic base is to decompose the alkali metal bicarbonate in the aqueous solution by forming alkali metal chloride and the nitrogenous organic base. According to the invention, it is desirable that the complement of hydrochloride be employed in a quantity which is sufficient to decompose all of the alkali metal bicarbonate in the aqueous solution. The complement of hydrochloride may advantageously be in an excess quantity relative to that strictly required to decompose all of the alkali metal bicarbonate in the aqueous solution, to accelerate the decomposition of the alkali metal bicarbonate.

When the treatment of the aqueous solution with the complement of hydrochloride is finished, an organic phase containing the nitrogenous organic base and an aqueous phase containing dissolved alkali metal chloride and dissolved hydrochloride of the nitrogenous organic base are collected.

Before the aqueous phase is treated with the basic agent, these two phases are separated from each other and the organic phase is recovered. This separation may be carried out by any suitable known means; in general a gravity separation is employed, which may be carried out under gravity or by centrifuging.

The basic agent may be any base capable of decomposing the hydrochloride to produce the nitrogenous organic base and residual compounds which are immiscible with the nitrogenous organic base. It is selected preferably from strong inorganic bases, particularly those whose $p^H$ is equal to at least 11, preferably higher than 12. Examples of inorganic bases which are suitable as the basic agent are alkali and alkaline-earth metal carbonates, oxides and hydroxides; water-soluble inorganic bases are preferred, especially sodium oxide and hydroxide. In the case where the basic agent is a water-soluble inorganic base, the latter may advantageously be employed in the form of an aqueous solution.

The reaction mixture collected at the end of the treatment with the basic agent contains two immiscible phases, one of which contains the nitrogenous organic base to be produced. To collect the latter, it is sufficient to subject the reaction mixture to a gravity separation; it is advantageous to add a solvent for the nitrogenous organic base beforehand. The choice of the nature and of the quantity of solvent to be employed is determined by the requirement that it forms, with the nitrogenous organic base, a solution whose viscosity does not interfere with efficient gravity separation. To this end, an organic solvent is preferably chosen which, at the operating temperature, has a viscosity which does not exceed 3 centipoises and preferably 1 centipoise. Furthermore, because of considerations of safety and ease of use, preferance is given to low-volatility organic solvents having a flash point above the working temperature. The choice of organic solvent may also be determined by the destination of the nitrogenous organic base. For example, when the intention is to produce an organic solution of amine for the manufacture of sodium bicarbonate using the amines method described earlier, it is desirable to choose an organic solvent which, in addition to the properties referred to earlier, is characterised by a high rate of absorption of carbon dioxide at a moderate temperature, generally below 100° C. and more particularly between 15° and 70° C.

An organic solvent is preferably employed for which the organic solution containing the nitrogenous organic base has a specific gravity below that of the aqueous phase. Advantageously a solvent is chosen such that the difference between the specific gravity of the aqueous phase and that of the organic solution be at least equal to 5% of the specific gravity of the said organic solution, and preferably greater than 30% of this specific gravity.

Because of considerations of an economic nature, the process according to the invention is preferably carried out at a low temperature, generally at a temperature below 60° C., preferably between 15° and 40° C. In this case, the organic solvent may be advantageously chosen from hydrocarbons, in a quantity adjusted so that the organic solution contains between 25 and 75% by weight of nitrogenous organic base. Examples of organic solvents which can be employed within the scope of the invention are xylene, butylbenzenes, methylethylbenzenes and, more particularly, white spirit and the commercial solvents known under the tradenames Isopar (Esso) which is a mixture of isoparaffins, Solvesso (Esso) which is a mixture of aromatic compounds, Shellsol AB (Shell) which is a mixture of aromatic compounds and Shellsol K which is a mixture or aliphatic compounds.

The solvent may be employed before, during or after the treatment with the basic agent.

The process according to the invention applies, in a general manner, to any water-insoluble nitrogenous organic bases, as defined above, which are capable of forming, with hydrogen chloride, water-soluble organic hydrochlorides; it is particularly highly suitable for the production of nitrogenous organic bases whose solubility in water does not exceed 0.5% by weight, and most especially for those whose solubility in water is below 0.05% by weight. It applies, for example, to imines and their derivatives, to quaternary ammonium salts and to amines and their derivatives. The process according to the invention can be applied equally well to the manufacture of primary, secondary or tertiary amines. It finds a specially advantageous application for the production of primary amines from their hydrochloride, and especially of primary alkylamines containing from 7 to 18 (preferably 12 to 14) carbon atoms, which find an advantageous use in the manufacture of sodium bicarbonate by the amines method described earlier. To this end, the process according to the invention may advantageously be combined with the said amines method, where it is then employed to regenerate the organic amine solution.

Consequently, the invention also relates to a process for the manufacture of sodium bicarbonate, according to which a mixture with an aqueous solution of sodium chloride and an organic solution of a water-insoluble amine is formed, the resultant mixture is treated with a gas containing carbon dioxide to form an aqueous suspension of sodium bicarbonate and an organic solution of amine hydrochloride and the aqueous suspension of sodium bicarbonate is treated to separate off the solid sodium bicarbonate which it contains and a mother liquor; according to the invention, the mother liquor is treated with at least a fraction of the organic solution of amine hydrochloride, an organic amine solution which is recycled to the abovementioned mixture and an aqueous solution are collected separately, the aqeuous solution is treated with a basic agent capable of decomposing the amine hydrochloride which it contains, and the resultant amine, which is recycled to the abovementioned mixture, and an aqueous phase, are collected by gravity separation.

In the process according to the invention, the organic solution fraction of amine hydrochloride is preferably employed in a sufficient quantity to cause the decomposition of all the sodium bicarbonate in the mother liquor.

In a preferred embodiment of the process for the manufacture of sodium bicarbonate according to the invention, the basic agent employed is an aqueous solution of sodium hydroxide and the residual aqueous phase from the gravity separation has sodium chloride added to it and is then recycled to the starting mixture. In order to add sodium chloride to the residual aqueous phase from the gravity separation it is possible, for example, to make it percolate through a deposit of rock salt.

DESCRIPTION OF THE PREFERRED EMBODIMENTS

Special features and details of the invention will emerge from the following description of the single FIGURE in the attached drawing, which shows the general layout of a plant for the manufacture of sodium bicarbonate by the amines method described earlier, which incorporates a preferred embodiment of the invention.

The plant shown in the FIGURE includes a crystallization chamber 1 which is continuously fed with a substantially saturated aqueous solution of sodium chloride 2, an organic solution of a primary amine 3 which is insoluble in the aqueous solution of sodium chloride, and a gas containing carbon dioxide 4. The organic solution of primary amine may be, for example, a solution at 50% strength by weight in xylene, of the amine Primene 81R (Rohm & Haas) which is a primary alkylamine containing between 12 and 14 carbon atoms in its molecule. The gas 4 is preferably an enriched gas, containing 60 to 80% by weight of carbon dioxide produced, for example, by mixing a lime kiln gas in suitable proportions with a residual gas from the calcination of sodium bicarbonate to sodium monocarbonate. The quantity of gas employed should be sufficient to convert a substantial part of the sodium chloride in solution 2 to sodium bicarbonate. As an alternative, the treatment in the crystallization chamber 1 may be preceded by a partial carbonation of the mixture by means of a gas having a low content of carbon dioxide, such as a lime kiln gas.

Drawn off from the crystallisation chamber 1 is a liquid 5 consisting of a mixture of aqueous solution and organic solution and containing sodium bicarbonate crystals in suspension. This liquid 5 is transferred to a gravity separation chamber 6, where an organic solution of amine hydrochloride 7 is separated by gravity from an aqueous slurry 8 of sodium bicarbonate crystals. The latter is directed to a straining or filtering device 9, where solid sodium bicarbonate 10 and a mother liquor 11 are collected separately. The latter is saturated with sodium bicarbonate and contains dissolved amine hydrochloride.

According to the invention, the organic solution of amine hydrochloride 7 is divided into two fractions 12 and 13, one fraction 12 and the mother liquor 11 are introduced into a reaction chamber 14 and are subjected to vigorous stirring therein to initiate a reaction between sodium bicarbonate and the amine hydrochloride resulting in the formation of sodium chloride, which goes into aqueous solution, primary amine which goes into organic solution, and carbon dioxide. The amount of fraction 12 is sufficient to decompose all of the sodium bicarbonate in the mother liquor. To promote the reaction between sodium bicarbonate and amine hydrochloride, the reaction chamber 14 is heated, for example to a temperature of the order of 60° C., and the carbon dioxide formed therein is removed by means of a vacuum pump 15. Carbon dioxide 28 withdrawn from the reaction chamber 14 by the pump 15 is advantageously pumped back to the crystallization chamber 1.

A liquid 16 consisting of a mixture of a dilute aqueous solution of sodium chloride and an organic solution of amine is drawn off from the reaction chamber 14; this liquid 16 is directed to a gravity separation chamber 17, from which the dilute aqueous solution of sodium chloride 18 and the organic solution of amine 19 are collected separately.

The dilute aqueous solution of sodium chloride 18 still contains dissolved amine hydrochloride. It is transferred to a reaction chamber 29, which is fed with an aqueous solution of sodium hydroxide 30, in a sufficient quantity to decompose all of the amine hydrochloride present in the sodium chloride solution 18. The aqueous solution 30 may advantageously consist of an aqueous solution containing between 30 and 60% by weight of sodium hydroxide, and produced by electrolysis of an aqueous solution of sodium chloride in an electrolysis cell containing mercury or a selectively permeable membrane. As an alternative, it may also be an aqueous solution containing between 10 and 20% by weight of sodium hydroxide and between 10 and 20% by weight of sodium chloride, which is produced by electrolysis of an aqueous solution of sodium chloride in a diaphragm cell.

The liquid 31 drawn off from the reaction chamber 29 is directed to a gravity separation chamber 32, from which a dilute aqueous solution of sodium chloride 33, free from amine hydrochloride, and an organic solution of amine 34, are collected separately.

The dilute aqueous solution of sodium chloride 33 is then introduced into a deposit of rock salt 20, from which an equivalent delivery of a saturated aqueous solution of sodium chloride 21 is drawn off and combined with the stream 2 of starting sodium chloride.

The organic solutions of amine 19 and 34, collected from gravity separation chambers 17 and 32 are integrally combined with the starting organic solution of amine 3 and introduced with the latter into the crystallization chamber 1.

As an alternative, all or a part 22 of the organic solutions of amine 19 and 34 is combined with the fraction 13 of the organic solution of amine hydrochloride.

According to a modified embodiment of the process, an organic solvent 35 for the amine is introduced into the reaction chamber 29, in order to facilitate the gravity separation in the chamber 32. As an alternative, the organic solvent 35 may be mixed with the aqueous solution 18 or the liquid 31.

Fraction 13 of the organic solution of amine hydrochloride (optionally mixed with the organic solution of amine 22) is then treated in a manner known per se in the amines technique, to regenerate the amine. To this end, it is sent to a reaction chamber 23, where it is subjected to a stirring with an aqueous suspension of calcium hydroxide 24, and the resultant reaction mixture 25 is sent to a gravity separation chamber 26, from which an aqueous solution of calcium chloride 27 and an organic solution of amine 3, which is recycled to the crystallization chamber 1, are collected separately.

The following example will be used to clarify the invention.

An aqueous solution of sodium chloride was employed, containing 100 g of sodium chloride per kg and saturated with the hydrochloride of the amine "Primene 81R" (Rohm & Haas). Thus, this solution contained 2.8 g of carbon per kg, contributed by the amine hydrochloride.

52.7 g of the said aqueous solution were mixed with 1.82 cm$^3$ of a normal solution of sodium hydroxide, and then 5 g of the organic solvent "Shellsol K" (Shell) were added to it.

After homogenizing, the resultant mixture was left to separate by gravity for 24 hours, the aqueous phase was collected and its residual content of amine was measured by determining the carbon: a concentration of 0.033 g of carbon per kg of aqueous phase was found.

It can be seen that the loss of amine in the aqueous phase is negligible.

We claim:

1. In a process for the production of a water-insoluble nitrogenous organic base including the steps of providing an aqueous solution of alkali metal bicarbonate and of a hydrochloride of the nitrogenous organic base; and treating the aqueous solution with a basic agent capable of decomposing the hydrochloride, the improvement comprising:

prior to treating the aqueous solution with the basic agent, treating the aqueous solution with a complement of the water soluble hydrochloride of the nitrogenous organic base whereby at least a portion of the alkali metal bicarbonate is decomposed forming alkali metal chloride and the water-insoluble nitrogenous organic base.

2. Process according to claim 1, wherein the complement of the hydrochloride of the nitrogenous organic base is employed in a quantity sufficient to decompose all of the alkali metal bicarbonate in the aqueous solution.

3. Process according to claim 1, including the further step of subjecting to a gravity separation the complement-treated aqueous solution to separate same into an aqueous phase and an organic phase, which aqueous phase is then treated with the basic agent.

4. Process according to claim 1, including the further step of subjecting the basic agent-treated aqueous solution to a gravity separation.

5. Process according to claim 4, wherein a solvent for the nitrogenous organic base is added to the basic agent-treated aqueous solution.

6. Process according to claim 1, wherein the basic agent is chosen from among water-soluble inorganic bases.

7. Process according to claim 6, wherein the basic agent employed is an alkali metal hydroxide.

8. Process according to claim 1, wherein the water-insoluble nitrogenous base is a primary alkylamine containing between 12 and 14 carbon atoms in its molecule.

9. In a process for the manufacture of sodium bicarbonate including the steps of mixing an aqueous solution of sodium chloride with an organic solution of a water-insoluble amine; treating the resultant mixture with a gas containing carbon dioxide to form an aqueous suspension of sodium bicarbonate and an organic solution of amine hydrochloride; and treating the aqueous suspension of sodium bicarbonate to separate the solid sodium bicarbonate which it contains from mother liquor, the improvement comprising;

treating the mother liquor with at least a fraction of the organic solution of amine hydrochloride whereby at least a portion of the sodium bicarbonate is decomposed forming sodium chloride and the water-insoluble amine;

collecting separately an organic solution of water-insoluble amine, which amine is recycled to the mixing step, and an aqueous solution;

treating the aqueous solution with a basic agent, which basic agent is capable decomposing the amine hydrochloride to a water-insolbule amine; and subjecting the basic agent-treated aqueous solution to gravity separation to separate an aqueous phase, which aqueous phase is collected, from the water-insoluble amine, which amine is recycled to the mixing step.

10. Process according to claim 9, wherein an aqueous solution of sodium hydroxide is employed as the basic agent and wherein the process includes the further steps of percolating the aqueous phase from the gravity separation through a deposit of rock salt followed by recycling the precolated aqueous phase to the mixing step.

* * * * *